United States Patent
Kawada et al.

(10) Patent No.: US 12,537,368 B2
(45) Date of Patent: Jan. 27, 2026

(54) GAS INSULATION APPARATUS

(71) Applicant: Mitsubishi Electric Corporation, Tokyo (JP)

(72) Inventors: Makiko Kawada, Tokyo (JP); Yosuke Oyanagi, Tokyo (JP); Shohei Sasayama, Tokyo (JP); Yasumichi Hatanaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 311 days.

(21) Appl. No.: 18/553,800

(22) PCT Filed: May 31, 2021

(86) PCT No.: PCT/JP2021/020682
§ 371 (c)(1),
(2) Date: Oct. 3, 2023

(87) PCT Pub. No.: WO2022/254522
PCT Pub. Date: Dec. 8, 2022

(65) Prior Publication Data
US 2024/0186771 A1 Jun. 6, 2024

(51) Int. Cl.
*H02B 13/045* (2006.01)
*F16J 13/12* (2006.01)
*F16J 15/02* (2006.01)

(52) U.S. Cl.
CPC ............ *H02B 13/045* (2013.01); *F16J 13/12* (2013.01); *F16J 15/021* (2013.01)

(58) Field of Classification Search
CPC ......... H02B 13/045; F16J 13/12; F16J 15/021
See application file for complete search history.

(56) References Cited

U.S. PATENT DOCUMENTS 11,578,680 B2 * 2/2023 Rockwell ............... F16J 15/022
12,322,934 B2 * 6/2025 Holaus ................... H02G 5/063

FOREIGN PATENT DOCUMENTS

| CN | 203423050 U | 2/2014 |
| CN | 212584508 U * | 2/2021 |

(Continued)

OTHER PUBLICATIONS

Koemmling, Anja et al., Insights for lifetime predictions of O-ring seals from five-year long-term aging tests. Polymer Degradation and Stability. vol. 179, 109278, Sep. 2020, https://doi.org/10.1016/j.polymdegradstab.2020.109278. (Year: 2020).*

(Continued)

*Primary Examiner* — Robert J Hoffberg
(74) *Attorney, Agent, or Firm* — BUCHANAN, INGERSOLL & ROONEY PC

(57) ABSTRACT

A gas insulation apparatus includes: a tank that includes a flange surrounding an opening and in which an insulating gas containing oxygen is enclosed; a lid that covers the opening; a bolt that fixes the lid to the flange; and a sealing member that is sandwiched between the flange and the lid, in which the sealing member includes a first O-ring that surrounds an entire circumference of the opening, and a second O-ring that surrounds the first O-ring, the first O-ring is made of fluorine-based rubber, and the second O-ring is made of ethylene propylene diene-based rubber.

4 Claims, 4 Drawing Sheets

(56) References Cited

FOREIGN PATENT DOCUMENTS

| | | | | |
|---|---|---|---|---|
| DE | 2831440 A1 | * | 1/1980 | ............. C10B 27/06 |
| DE | 10339638 A1 | * | 3/2005 | ............ F28F 9/0246 |
| JP | S5928809 A | | 2/1984 | |
| JP | H0534358 U | * | 5/1993 | |
| JP | H0638138 U | | 5/1994 | |
| JP | H0638140 U | | 5/1994 | |
| JP | H08193679 A | | 7/1996 | |
| JP | H10257619 A | * | 9/1998 | |
| JP | 2004053429 A | * | 2/2004 | |
| JP | 2014121207 A | | 6/2014 | |
| JP | 2019176018 A | * | 10/2019 | |
| WO | WO-2004072985 A1 | * | 8/2004 | ............... G21F 5/12 |

OTHER PUBLICATIONS

International Search Report (PCT/ISA/210) with translation and Written Opinion (PCT/ISA/237) mailed on Aug. 24, 2021, by the Japan Patent Office as the International Searching Authority for International Application No. PCT/JP2021/020682. (12 pages).

Office Action (Notification of Reasons for Refusal) issued on Jan. 4, 2022, by the Japanese Patent Office in corresponding Japanese Patent Application No. 2021-562398 and English translation of the Office Action. (13 pages).

Extended European Search Report dated Jun. 12, 2024, issued in the corresponding European Patent Application No. 21944032.8, 7 pages.

Communication Pursuant to Article 94(3) EPC dated Feb. 27, 2025, issued in the corresponding European Patent Application No. 21944032.8, 5 pages.

* cited by examiner

GAS INSULATION APPARATUS

FIELD

The present disclosure relates to a gas insulation apparatus in which an insulating gas is enclosed in a tank.

BACKGROUND

A gas insulation apparatus in which an insulating gas is enclosed in a tank is used for a high-voltage electric circuit. The gas insulation apparatus is provided with a sealing structure at a flange portion of the tank in order to prevent leakage of the insulating gas in the tank.

Patent Literature 1 discloses a gas insulation apparatus that prevents gas leakage in a tank by sandwiching a first sealing member and a second sealing member between a flange disposed at an end portion of the tank in which an insulating gas is enclosed and a lid body.

CITATION LIST

Patent Literature

Patent Literature 1: Japanese Patent Application Laid-open No. 2014-121207

SUMMARY OF INVENTION

Problem to be Solved by the Invention

Sulfur hexafluoride, which has been widely used as an insulating gas, is a greenhouse gas with a global warming potential of 23500. Therefore, it has been studied to use a mixed gas of carbon dioxide and oxygen, or air, main components of which are nitrogen and oxygen as an alternative gas.

In a case where an insulating gas contains oxygen, deterioration of the sealing member is accelerated as compared with a case where sulfur hexafluoride is used as the insulating gas, and the life in which the insulating gas can be sealed is shortened. Furthermore, carbon dioxide, oxygen, and nitrogen have small molecules as compared with sulfur hexafluoride. Therefore, gases of carbon dioxide, oxygen, and nitrogen easily permeate through the sealing member.

In the gas insulation apparatus disclosed in Patent Literature 1, sulfur hexafluoride is used as an insulating gas, and use of a mixed gas of carbon dioxide and oxygen or air as the insulating gas is not considered. For this reason, in the gas insulation apparatus disclosed in Patent Literature 1, when a mixed gas of carbon dioxide and oxygen or air is used as the insulating gas, there is a problem that deterioration of the sealing member is accelerated by oxygen, the life in which the insulating gas can be sealed is shortened, or the insulating gas leaks while permeating through the sealing member.

The present disclosure has been made in view of the above, and an object of the present disclosure is to obtain a gas insulation apparatus in which an insulating gas containing oxygen is less likely to leak while permeating through a sealing member, the occurrence of shortening of the life in which the insulating gas can be sealed, which is caused due to deterioration of the sealing member by oxygen, is reduced.

Means to Solve the Problem

In order to solve the above-mentioned problems and achieve the object, a gas insulation apparatus according to the present disclosure includes: a tank that includes a flange surrounding an opening and in which an insulating gas containing oxygen is enclosed; a lid that covers the opening; a bolt that fixes the lid to the flange; and a sealing member that is sandwiched between the flange and the lid. The sealing member includes a first sealing member that surrounds an entire circumference of the opening, and a second sealing member that surrounds the first sealing member. The first sealing member is made of fluorine-based rubber, and the second sealing member is made of ethylene propylene diene-based rubber. At least one of the first sealing member and the second sealing member is an O-ring.

Effects of the Invention

According to the present disclosure, it is possible to achieve the effect of providing a gas insulation apparatus in which an insulating gas containing oxygen is less likely to leak while permeating through a sealing member, the occurrence of shortening of the life in which the insulating gas can be sealed, which is caused due to deterioration of the sealing member by oxygen, is reduced.

DESCRIPTION OF EMBODIMENTS

Hereinafter, a gas insulation apparatus according to embodiments will be described in detail with reference to the drawings.

First Embodiment

Figure 1:
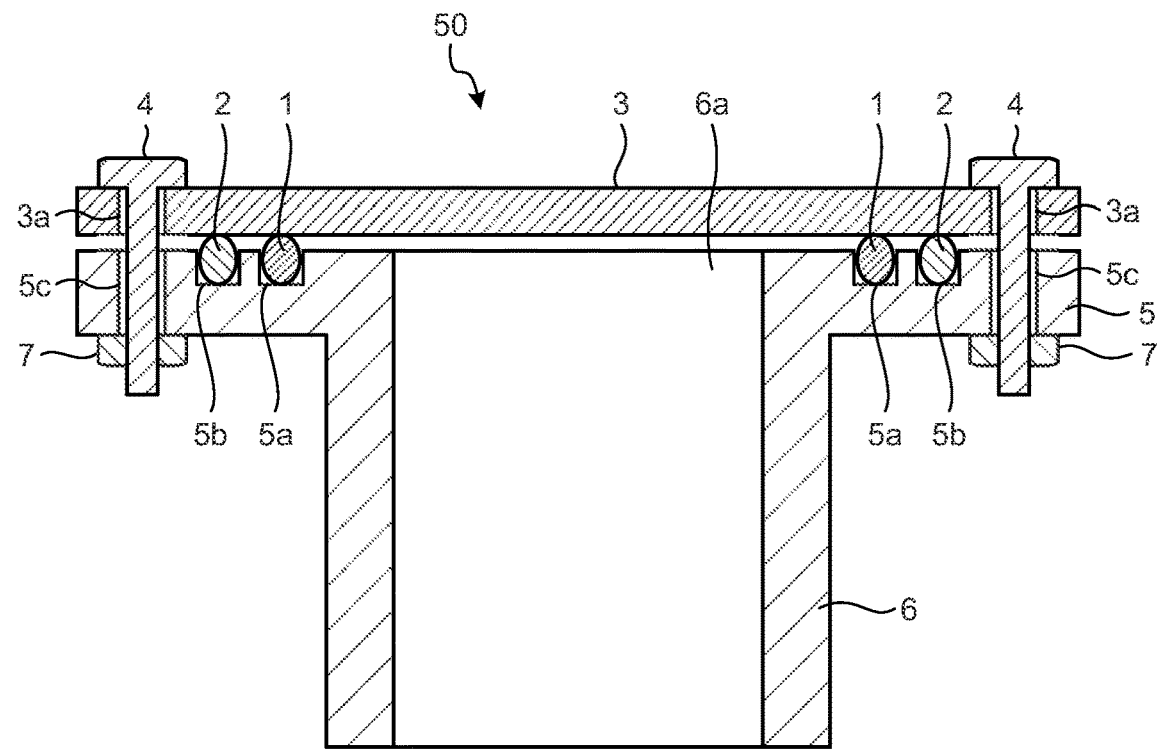
FIG. 1 is a cross-sectional view of a gas insulation apparatus according to a first embodiment at an end portion where an opening is formed in a tank.
Figure 2:
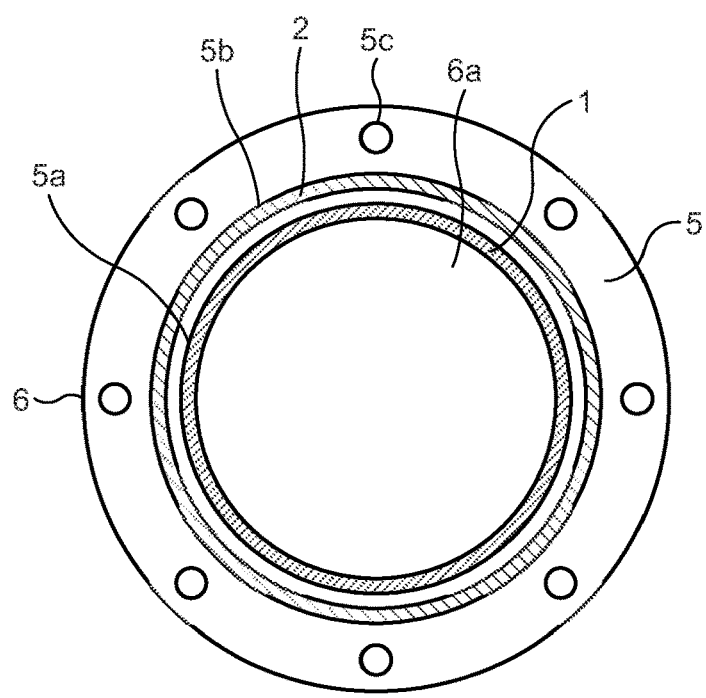
FIG. 2 is a side view of a portion of the gas insulation apparatus according to the first embodiment where the opening is formed in the tank.

FIG. 1 is a cross-sectional view of a gas insulation apparatus according to the first embodiment at an end portion where an opening is formed in a tank. FIG. 2 is a side view of a portion of the gas insulation apparatus according to the first embodiment where the opening is formed in the tank. A gas insulation apparatus 50 according to the first embodiment includes a cylindrical tank 6 in which an insulating gas is enclosed and a lid 3 that covers an opening 6a formed at an end portion of the tank 6. The end portion of the tank 6 is formed with a flange 5. In the lid 3 and the flange 5, holes 3a and 5c through which bolts 4 pass are formed. The lid 3 is attached to the flange 5 by tightening nuts 7 onto the bolts 4 that pass through the holes 3a and holes 5c. The flange 5 is formed with annular grooves 5a and 5b that surround the opening 6a. The diameter of the annular groove 5a is smaller than the diameter of the annular groove 5b. A first O-ring 1 that is a first sealing member is disposed in the annular groove 5a, and a second O-ring 2 that is a second sealing member is disposed in the annular groove 5b. The second O-ring 2 that is the second sealing member surrounds the first O-ring 1 that is the first sealing member. The first O-ring 1 and the second O-ring 2 have circular cross sections and are disposed and positioned within the annular grooves 5a and 5b. The first O-ring 1 and the second O-ring 2 are compressed by being sandwiched between the flange 5 and the lid 3. The first O-ring 1 is formed using fluorine-based rubber as a material. For example, as the first O-ring 1, an O-ring formed using fluorine-based rubber, a main component of which is a copolymer with poly vinylidene difluoride indicated by an identification symbol FKM-70 representing the type of material in JIS B 2401, as a material, can be applied.

The second O-ring 2 is formed using ethylene propylene diene-based rubber that is classified as an M group in JIS K 6397 as a material. For example, as the second O-ring 2, an O-ring formed using ethylene propylene diene-based rubber, a main component of which is a copolymer of ethylene and propylene, and the like, indicated by an identification symbol EPDM-70 indicating the type of material in JIS B 2401, as a material, can be applied.

The insulating gas is not limited to a specific composition as long as the insulating gas is a gas containing oxygen, and is preferably a mixed gas of nitrogen and oxygen or a mixed gas of carbon dioxide and oxygen from the viewpoint of insulating property, boiling point, and environmental compatibility.

In a case where a mixed gas of nitrogen and oxygen is used as the insulating gas, the mixing ratio of nitrogen and oxygen is preferably close to the composition of air, specifically, for nitrogen from 70% to 90% and for oxygen from 10% to 30% from the viewpoint of safety. Furthermore, the pressure is preferably from 0.7 MPa abs to 0.9 MPa abs from the viewpoint of insulating property.

In a case where a mixed gas of carbon dioxide and oxygen is used as the insulating gas, the mixing ratio of carbon dioxide and oxygen is preferably for carbon dioxide from 60% to 80% and for oxygen from 20% to 40% from the viewpoint of safety and insulating property. Furthermore, the pressure is preferably from 0.8 MPa abs to 1.0 MPa abs from the viewpoint of insulating property.

The first O-ring 1 formed using fluorine-based rubber as a material has high deterioration resistance to oxygen and low gas permeability as compared with the second O-ring 2 formed using ethylene propylene diene-based rubber as a material. On the other hand, fluorine-based rubber changes from a rubber state to a glass state and becomes hard at a low temperature. Therefore, gas sealability of the first O-ring 1 is lower than that of the second O-ring 2 at a low temperature.

In the gas insulation apparatus 50 according to the first embodiment, the first O-ring 1 is disposed on the inner diameter side of the flange 5, and the second O-ring 2 is disposed on the outer diameter side of the flange 5. Therefore, the insulating gas in the tank 6 is in contact with the first O-ring 1. The first O-ring 1 is formed using fluorine-based rubber having high deterioration resistance to oxygen as a material. Therefore, the insulating gas is less likely to leak even if the insulating gas containing oxygen is enclosed in the tank 6. Therefore, the life, in which the insulating gas can be sealed, of the gas insulation apparatus 50 according to the first embodiment is less likely to be shortened. Furthermore, the first O-ring 1 has low gas permeability. Therefore, the insulating gas enclosed in the tank 6 is less likely to leak out through the first O-ring 1. Moreover, the second O-ring 2 that surrounds the first O-ring 1 is less likely to deteriorate in gas sealability even at a low temperature. Therefore, the insulating gas is less likely to leak even in a case where the gas insulation apparatus 50 is exposed to a low temperature environment.

Second Embodiment

Figure 3:
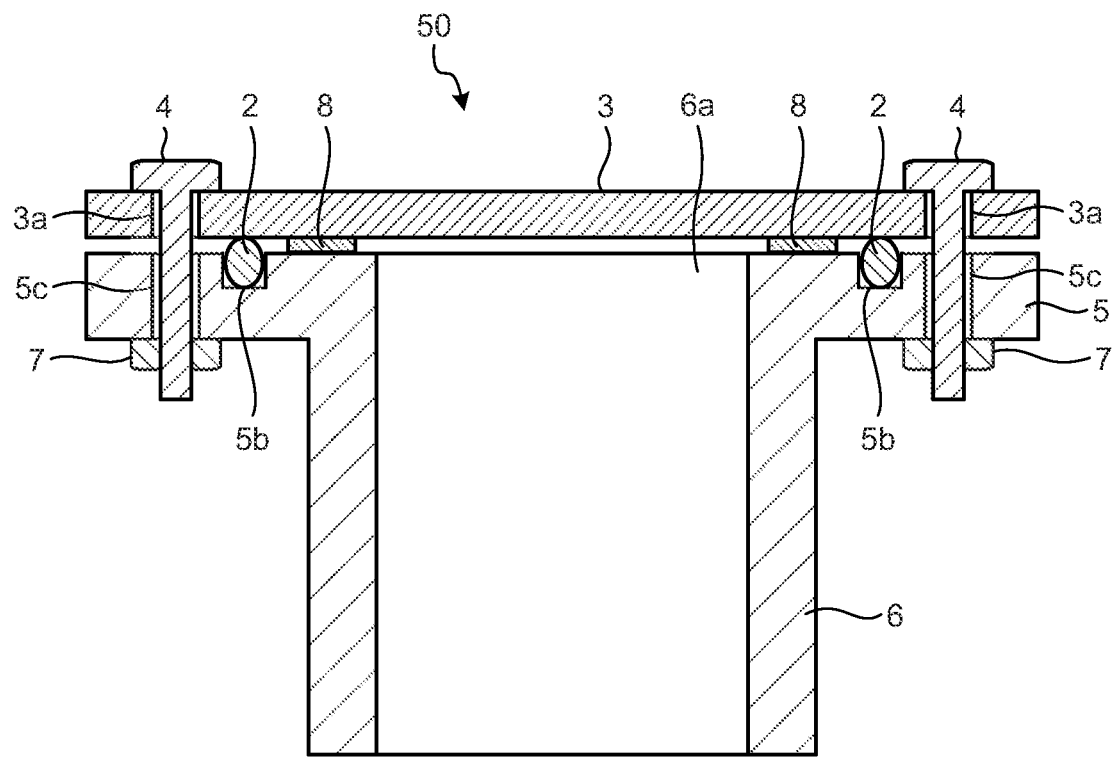
FIG. 3 is a cross-sectional view of a gas insulation apparatus according to a second embodiment at an end portion where an opening is formed in a tank.

FIG. 3 is a cross-sectional view of a gas insulation apparatus according to the second embodiment at an end portion where an opening is formed in a tank. In the gas insulation apparatus 50 according to the second embodiment, the first sealing member is a first packing 8. The first packing 8 has an annular shape that surrounds an entire circumference of the opening 6a. Furthermore, the first packing 8 has a rectangular cross section. The first packing 8 is formed using fluorine-based rubber as a material. The flange 5 is not formed with an annular groove at a portion where the first packing 8 is disposed, and only formed with the annular groove 5b where the second O-ring 2 is disposed. Other details in the second embodiment are similar to those of the gas insulation apparatus 50 according to the first embodiment. Therefore, duplicated descriptions thereof are omitted.

In the gas insulation apparatus 50 according to the second embodiment, the first packing 8 having a rectangular cross section can be disposed between the flange 5 and the lid 3 without forming an annular groove. Therefore, there is no need to form an annular groove for disposing the first sealing member in the flange 5, and thus the processing cost of the flange 5 can be reduced. Furthermore, an annular groove for disposing the first sealing member is unnecessary. Therefore, a distance between the first sealing member and the second sealing member can be made smaller than that in the gas insulation apparatus 50 according to the first embodiment.

Third Embodiment

Figure 4:
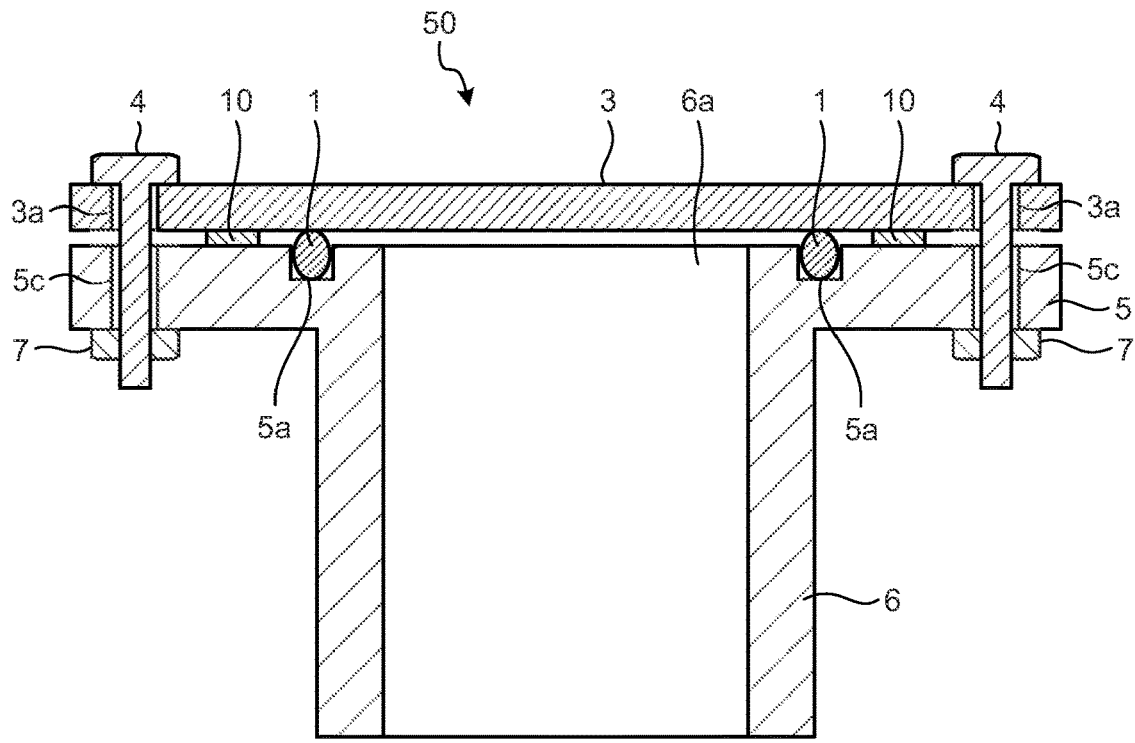
FIG. 4 is a cross-sectional view of a gas insulation apparatus according to a third embodiment at an end portion where an opening is formed in a tank.

FIG. 4 is a cross-sectional view of a gas insulation apparatus according to the third embodiment at an end portion where an opening is formed in a tank. In the gas insulation apparatus 50 according to the third embodiment, the second sealing member is a second packing 10. The second packing 10 has an annular shape that surrounds the first O-ring 1 that is the first sealing member. Furthermore, the second packing 10 has a rectangular cross section. The second packing 10 is formed using ethylene propylene diene-based rubber as a material. The flange 5 is not formed with an annular groove at a portion where the second packing 10 is disposed, and only formed with the annular groove 5a where the first O-ring 1 is disposed. Other details in the third embodiment are similar to those of the gas insulation apparatus 50 according to the first embodiment. Therefore, duplicated descriptions thereof are omitted.

In the gas insulation apparatus 50 according to the third embodiment, the second packing 10 having a rectangular cross section can be disposed between the flange 5 and the lid 3 without forming an annular groove. Therefore, there is no need to form an annular groove for disposing the second sealing member in the flange 5, and thus the processing cost of the flange 5 can be reduced. Furthermore, an annular groove for disposing the second sealing member is unnecessary. Therefore, a distance between the first sealing member and the second sealing member can be made smaller than that in the gas insulation apparatus 50 according to the first embodiment.

Fourth Embodiment

Figure 5:
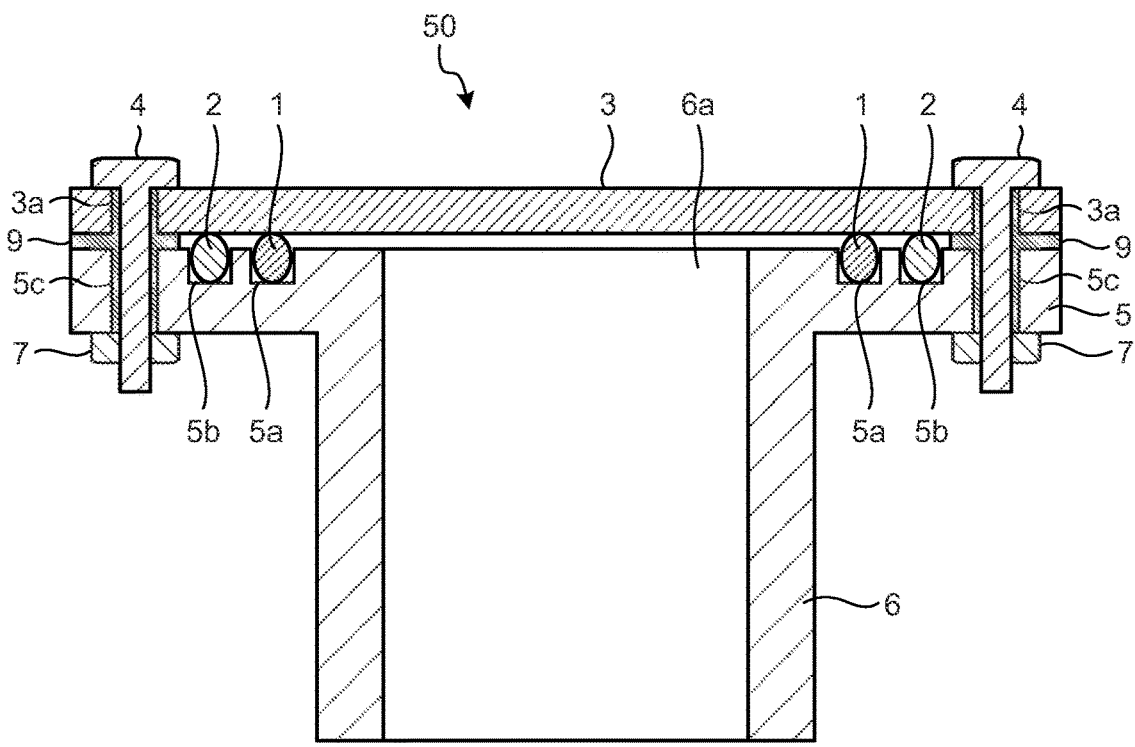
FIG. 5 is a cross-sectional view of a gas insulation apparatus according to a fourth embodiment at an end portion where an opening is formed in a tank.

FIG. 5 is a cross-sectional view of a gas insulation apparatus according to the fourth embodiment at an end portion where an opening is formed in a tank. In the gas insulation apparatus 50 according to the fourth embodiment, silicone sealant 9 is filled in the holes 3a and 5c through which the bolts 4 pass, and also filled in a space on the flange 5 on the outer edge side of the portion where the second sealing member is disposed. Other details in the fourth embodiment are similar to those of the gas insulation apparatus 50 according to the first embodiment. Therefore, duplicated descriptions thereof are omitted. Note that the silicone sealant 9 is sufficient to be disposed in at least the space on the flange 5 on the outer edge side of the portion where the second sealing member is disposed, and the silicone sealant 9 may not be disposed in the holes 3a and 5c through which the bolts 4 pass.

As the silicone sealant 9, condensation reaction curable liquid silicone rubber of one liquid type can be applied.

The gas insulation apparatus 50 according to the fourth embodiment can prevent moisture from entering from bolt holes and the outer edge portion of the flange 5, and thus rusting of the flange 5 can be prevented. Therefore, the gas insulation apparatus 50 according to the fourth embodiment can reduce gaps from being formed between the first O-ring 1 that is the first sealing member, the second O-ring 2, and the flange 5 due to the generation of rust on the flange 5. Therefore, it is possible to reduce leakage of the insulating gas enclosed in the tank 6.

Fifth Embodiment

Figure 6:
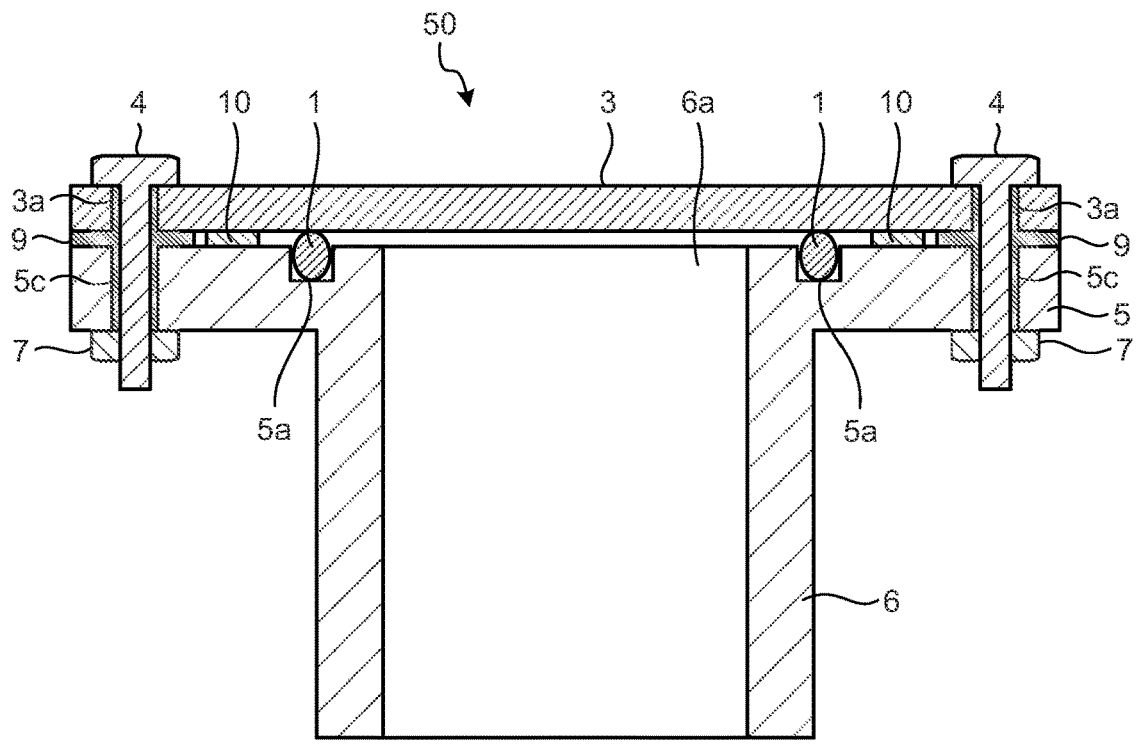
FIG. 6 is a cross-sectional view of a gas insulation apparatus according to a fifth embodiment at an end portion where an opening is formed in a tank.

FIG. 6 is a cross-sectional view of a gas insulation apparatus according to the fifth embodiment at an end portion where an opening is formed in a tank. In the gas insulation apparatus 50 according to the fifth embodiment, silicone sealant 9 is filled in the holes 3a and 5c through which the bolts 4 pass, and also filled in a space on the flange 5 on the outer edge side of the portion where the second sealing member is disposed. Other details in the fifth embodiment are similar to those of the gas insulation apparatus 50 according to the second embodiment. Therefore, duplicated descriptions thereof are omitted. Note that the silicone sealant 9 is sufficient to be disposed in at least the space on the flange 5 on the outer edge side of the portion where the second sealing member is disposed, and the silicone sealant 9 may not be disposed in the holes 3a and 5c through which the bolts 4 pass.

In the gas insulation apparatus 50 according to the fifth embodiment, there is no need to form an annular groove for disposing the first sealing member in the flange 5. Therefore, processing cost of the flange 5 can be reduced. Furthermore, an annular groove for disposing the first sealing member is unnecessary. Therefore, a distance between the first sealing member and the second sealing member can be made smaller than that in the gas insulation apparatus 50 according to the first embodiment. Moreover, the gas insulation apparatus 50 according to the fifth embodiment can reduce the roughening of the surface of the flange 5 due to the generation of rust on the flange 5. Therefore, it is possible to reduce gaps from being formed between the first packing 8 that is the first sealing member, the second O-ring 2, and the flange 5, and thus leakage of the insulating gas enclosed in the tank 6 can be reduced.

Sixth Embodiment

Figure 7:
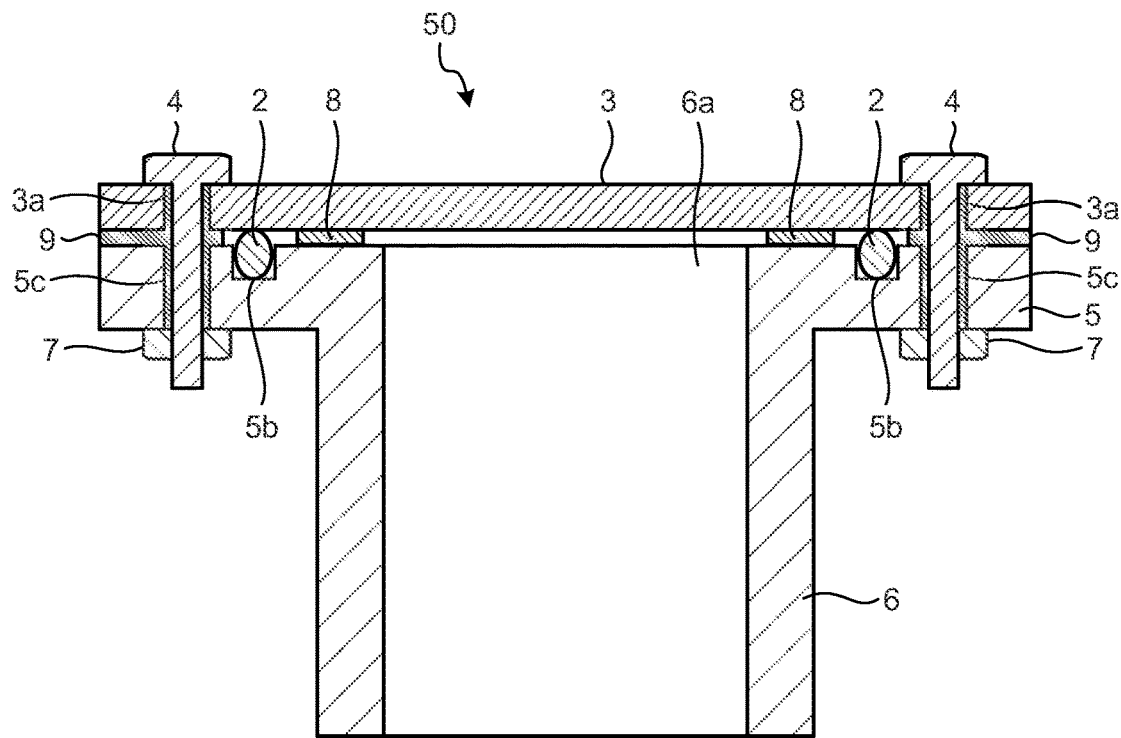
FIG. 7 is a cross-sectional view of a gas insulation apparatus according to a sixth embodiment at an end portion where an opening is formed in a tank.

FIG. 7 is a cross-sectional view of a gas insulation apparatus according to the sixth embodiment at an end portion where an opening is formed in a tank. In the gas insulation apparatus 50 according to the sixth embodiment, silicone sealant 9 is filled in the holes 3a and 5c through which the bolts 4 pass, and also filled in a space on the flange 5 on the outer edge side of the portion where the second sealing member is disposed. Other details in the sixth embodiment are similar to those of the gas insulation apparatus 50 according to the third embodiment. Therefore, duplicated descriptions thereof are omitted. Note that the silicone sealant 9 is sufficient to be disposed in at least the space on the flange 5 on the outer edge side of the portion where the second sealing member is disposed, and the silicone sealant 9 may not be disposed in the holes 3a and 5c through which the bolts 4 pass.

In the gas insulation apparatus 50 according to the sixth embodiment, there is no need to form an annular groove for disposing the second sealing member in the flange 5. Therefore, processing cost of the flange 5 can be reduced. Furthermore, an annular groove for disposing the second sealing member is unnecessary. Therefore, a distance between the first sealing member and the second sealing member can be made smaller than that in the gas insulation apparatus 50 according to the first embodiment. Moreover, the gas insulation apparatus 50 according to the sixth embodiment can reduce the roughening of the surface of the flange 5 due to the generation of rust on the flange 5. Therefore, it is possible to reduce gaps from being formed between the first O-ring 1 that is the first sealing member, the second packing 10, and the flange 5, thus leakage of the insulating gas enclosed in the tank 6 can be reduced.

The above configurations illustrated in the embodiments are examples of the contents, and can be combined with other known techniques, and the above configurations can be partly omitted or changed without departing from the gist.

REFERENCE SIGNS LIST

1 first O-ring; 2 second O-ring; 3 lid; 3a, 5c hole; 4 bolt; 5 flange; 5a, 5b annular groove; 6 tank; 6a opening; 7 nut; 8 first packing; 9 silicone sealant; 10 second packing; 50 gas insulation apparatus.

The invention claimed is:
1. A gas insulation apparatus, comprising:
a tank that includes a flange surrounding an opening and in which an insulating gas containing oxygen is enclosed;
a lid to cover the opening;
a bolt to fix the lid to the flange; and
a sealing member that is sandwiched between the flange and the lid, wherein
the sealing member includes a first sealing member that surrounds an entire circumference of the opening, and a second sealing member that surrounds the first sealing member,
the insulating gas is enclosed in the tank at a pressure higher in oxygen partial pressure than atmospheric air,
the first sealing member is made of fluorine-based rubber, the second sealing member is made of ethylene propylene diene-based rubber, and at least one of the first sealing member and the second sealing member is an O-ring.

2. The gas insulation apparatus according to claim 1, comprising a silicone sealant layer that is provided between the flange and the lid, the silicone sealant layer surrounding the second sealing member.

3. The gas insulation apparatus according to claim 2, wherein the silicone sealant layer is formed in a hole through which the bolt passes in the flange and the lid.

4. The gas insulation apparatus according to claim 1, wherein one of the first sealing member and the second sealing member is a packing.

* * * * *